United States Patent
Kim et al.

(10) Patent No.: US 11,649,786 B2
(45) Date of Patent: May 16, 2023

(54) HYBRID ROCKET ENGINE USING ELECTRIC MOTOR-DRIVEN OXIDIZER PUMP

(71) Applicant: INNOSPACE CO., LTD., Sejong (KR)

(72) Inventors: Soo Jong Kim, Sejong (KR); Sung Bong Cho, Suwon-si (KR); Keun Hwan Moon, Sejong (KR); Sung Hoon Ryu, Sejong (KR)

(73) Assignee: INNOSPACE CO., LTD., Sejong (KR)

( * ) Notice: Subject to any disclaimer, the term of this patent is extended or adjusted under 35 U.S.C. 154(b) by 0 days.

(21) Appl. No.: 17/293,127

(22) PCT Filed: Nov. 19, 2019

(86) PCT No.: PCT/KR2019/015798
§ 371 (c)(1),
(2) Date: May 12, 2021

(87) PCT Pub. No.: WO2020/111622
PCT Pub. Date: Jun. 4, 2020

(65) Prior Publication Data
US 2022/0003188 A1    Jan. 6, 2022

(30) Foreign Application Priority Data

Nov. 29, 2018  (KR) .................. 10-2018-0151430

(51) Int. Cl.
*F02K 9/44* (2006.01)
*F02K 9/08* (2006.01)
(Continued)

(52) U.S. Cl.
CPC .............. *F02K 9/44* (2013.01); *F02K 9/08* (2013.01); *F02K 9/46* (2013.01); *F02K 9/50* (2013.01);
(Continued)

(58) Field of Classification Search
CPC ..... F02K 9/44; F02K 9/46; F02K 9/50; F02K 9/563; F02K 9/72
See application file for complete search history.

(56) References Cited

U.S. PATENT DOCUMENTS 3,170,295 A  *  2/1965  Dryden .............. F02K 9/44
                                              60/39.48
4,741,502 A  *  5/1988  Rosen ............... B64G 1/007
                                              244/158.9

(Continued)

FOREIGN PATENT DOCUMENTS

CN     107503862 A    12/2017
JP     2007016781 A    1/2007

(Continued)

*Primary Examiner* — Todd E Manahan
*Assistant Examiner* — Kyle Robert Thomas
(74) *Attorney, Agent, or Firm* — United One Law Group LLC; Kongsik Kim; Jhongwoo Peck

(57) ABSTRACT

Proposed is a hybrid rocket engine using an electric motor-driven oxidizer pump, the hybrid rocket engine including: an oxidizer tank configured to store the oxidizer; an oxidizer pump configured to pressurize the oxidizer by being connected to the oxidizer tank through a first oxidizer supply line; a drive unit including an electric motor configured to drive the oxidizer pump and a battery configured to supply power to the electric motor; an auxiliary oxidizer line configured to guide the oxidizer from the oxidizer tank to the electric motor to cool the electric motor; an oxidizer recirculation line configured to recharge oxidizer vapor, generated through heat exchange between the electric motor and the oxidizer, to the oxidizer tank, thereby pressurizing an inner side of the oxidizer tank; and a combustion chamber configured to combust the oxidizer and fuel by being connected to the oxidizer pump through a second oxidizer supply line.

6 Claims, 2 Drawing Sheets

(51) Int. Cl.
*F02K 9/46* (2006.01)
*F02K 9/50* (2006.01)
*F02K 9/56* (2006.01)
*F02K 9/72* (2006.01)

(52) U.S. Cl.
CPC ............... *F02K 9/563* (2013.01); *F02K 9/72* (2013.01); *F05D 2260/213* (2013.01)

(56) References Cited

U.S. PATENT DOCUMENTS

| | | | |
|---|---|---|---|
| 5,765,361 A * | 6/1998 | Jones | F02K 9/26 60/204 |
| 6,314,978 B1 * | 11/2001 | Lanning | B64G 1/402 137/1 |
| 8,632,319 B2 * | 1/2014 | Raymond | F02K 9/563 417/374 |
| 11,060,482 B2 * | 7/2021 | Kwak | F02K 9/48 |
| 2014/0260186 A1 * | 9/2014 | Bahn | F02K 9/42 60/257 |
| 2016/0177874 A1 | 6/2016 | Roz et al. | |
| 2018/0058378 A1 * | 3/2018 | Roz | F02K 9/46 |
| 2018/0230948 A1 * | 8/2018 | Kwak | F02K 9/46 |

FOREIGN PATENT DOCUMENTS

| | | |
|---|---|---|
| JP | 2016-531233 A | 10/2016 |
| KR | 10-1682418 B1 | 12/2016 |
| KR | 10-2018-0045030 A | 5/2018 |
| KR | 10-2041568 B1 | 11/2019 |

\* cited by examiner

HYBRID ROCKET ENGINE USING ELECTRIC MOTOR-DRIVEN OXIDIZER PUMP

CROSS-REFERENCE TO RELATED APPLICATIONS

This application is a National Stage Entry of International Application PCT/KR2019/015798 filed on Nov. 19, 2019, which claims priority to Korean Application 10-2018-0151430 filed on Nov. 29, 2018. The aforementioned applications are incorporated herein by reference in their entireties.

TECHNICAL FIELD

The present disclosure relates to a hybrid rocket engine using an electric motor-driven oxidizer pump. More particularly, the present disclosure relates to a hybrid rocket engine using an electric motor-driven oxidizer pump that prevents a sudden pressure drop in an oxidizer tank from occurring by using pressure generated by an oxidizer evaporated at the same time when a low-temperature oxidizer cools an overheated electric motor and battery.

BACKGROUND ART

In general, rockets fly by generating thrust with energy generated through combustion of a propellant composed of fuel and oxidizer. Depending on phases of such fuels and oxidizers, rockets are classified into solid, liquid, and hybrid rockets. In the case of the hybrid rocket, the fuel is solid, and the oxidizer is liquid or gas.

The hybrid rocket has advantages of separating and storing the fuel and the oxidizer and of being capable of controlling thrust and of being stopped and restarted, by controlling the flow rate of the oxidizer. In order to secure such important functions and performances, the oxidizer needs to be reliably supplied, and a separate pressurization system is required therefor.

In addition, the pressurization system for supplying the oxidizer in the hybrid rocket uses: a self-pressurizing method that uses own properties of the oxidizer, such as nitrous oxide, having high saturated vapor pressure at room temperature, such as nitrous oxide; a gas pressurization method that pressurizes the oxidizer using pressure of a separate high-pressure vessel stored with helium or nitrogen at high pressure; and a turbo pump pressurization method that pressurizes the oxidizer using a pump connected to a turbine driven by the momentum of the combustion gas obtained by combusting the fuel and the oxidizer in a separate device such as a gas generator.

In the self-pressurizing method, the weight of the oxidizer tank is increased because it is necessary to secure structural rigidity of the oxidizer tank capable of withstanding ullage in the oxidizer tank and an actual oxidizer supply pressure. In addition, as the oxidizer is exhausted, there is a problem that the thrust fluctuations increase due to a sudden pressure drop inside the oxidizer tank.

In the gas pressurization method, there are drawbacks of: requiring an additional increase in the weight of a projectile as there needs to be a separate high-pressure container that stores inert gases such as helium or nitrogen at high pressure; and of being incapable of supplying the oxidizer to be pressurized in a uniform and stable way due to continuous exhaustion of the pressurizing gas.

The turbo pump pressurization method using the momentum of the combustion gas generated by the gas generator typically uses a series of systems that drive the turbine with the combustion gas generated by the gas generator and supply the oxidizer by rotating a pump coaxially connected with the turbine.

In this way, when the gas generator is used as a power source for the pump, the weight of the projectile is increased because the separate oxidizer and fuel need to be loaded. In addition, due to additionally required parts or devices such as the gas generator, the fuel/oxidizer supply device, the turbine, and the like, the rocket is embedded with inherent problems that a structure becomes complicated and the weight is increased.

Moreover, the turbo pump pressurization method has high effectiveness in a liquid rocket that drives both the fuel pump and the oxidizer pump with a single gas generator and turbine system. However, when the turbo pump pressurization method is applied to a hybrid rocket requiring only pressurization of the oxidizer, the complexity and weight of the hybrid rocket are greatly increased whereas the effectiveness thereof is reduced, thereby reducing the advantages of the hybrid rocket.

Documents of related art include Korean Patent No. 10-1682418 (Title of the disclosure: Liquid Rocket Engine Using Pump Driven by Electric Motor, published on Dec. 5, 2016) and Korean Patent No. 10-1409938 (Title of the disclosure: Pressure Correcting Apparatus of Turbo pump Engine for Rocket Using Liquid Type Propellants, Publication date: Jun. 13, 2014).

DISCLOSURE

Technical Problem

Accordingly, the present disclosure has been made keeping in mind the above problems occurring in the related art, and an objective of the present disclosure is to provide a hybrid rocket engine using an electric motor-driven oxidizer pump, which maintains a pressure of a front stage thereof to be constant, thereby being secured to have a reliable oxidizer supply characteristic, by preventing a sudden pressure drop in an oxidizer tank from occurring using pressure, which is generated by an oxidizer evaporated at the same time when a low-temperature oxidizer cools an overheated electric motor and battery.

Technical Solution

According to an exemplary embodiment for achieving an objective of the present disclosure, there may be provided a hybrid rocket engine using an electric motor-driven oxidizer pump according to the present disclosure, the hybrid rocket engine including: an oxidizer tank configured to store an oxidizer; an oxidizer pump configured to pressurize the oxidizer by being connected to the oxidizer tank through a first oxidizer supply line; a drive unit including an electric motor configured to drive the oxidizer pump and a battery configured to supply power to an electric motor; an auxiliary oxidizer line configured to guide the oxidizer from the oxidizer tank to the electric motor to cool the electric motor of the drive unit; an oxidizer recirculation line configured to recharge oxidizer vapor, generated through heat exchange between the electric motor and the oxidizer, to the oxidizer tank, thereby pressurizing an inner side of the oxidizer tank; and a combustion chamber configured to combust the oxidizer and fuel by being connected to the oxidizer pump through a second oxidizer supply line.

The auxiliary oxidizer line may have a structure configured to supply a portion of the oxidizer supplied through the first oxidizer supply line to the electric motor and to maintain a pressure of the oxidizer tank to be constant by feeding oxidizer vapor, generated when the electric motor is cooled, to the oxidizer tank through the oxidizer recirculation line.

The hybrid rocket engine using the electric motor-driven oxidizer pump may include an oxidizer discharge line configured to discharge the oxidizer to the outside by being branched off the oxidizer recirculation line, wherein the oxidizer discharge line may include an oxidizer discharge valve that may be opened to discharge the oxidizer or closed, and the second oxidizer supply line may include a main oxidizer supply valve that may be opened to supply the oxidizer to the combustion chamber or closed.

The oxidizer tank may include a pressure sensor configured to measure pressure inside the oxidizer tank and may further include a controller configured to receive data from the pressure sensor and to control the oxidizer discharge valve, the main oxidizer supply valve, and the electric motor according to a set algorithm.

The oxidizer discharge valve may have a structure configured to be opened when the pressure of the oxidizer tank is greater than set pressure and to be closed when the pressure of the oxidizer tank is no greater than the set pressure of the oxidizer tank.

Advantageous Effects

According to the hybrid rocket engine using the electric motor-driven oxidizer pump according to the present disclosure, the electric motor and the battery are used to drive the pump so as to supply the oxidizer, thereby simplifying the pressurization system and reducing the weight of the oxidizer tank, so that advantages as a projectile propulsion engine can be maximized.

In addition, the electric drive unit including the electric motor and battery is cooled by the low-temperature oxidizer being circulated there through. Through this process, the evaporated and pressurized oxidizer is recharged to a top portion of the oxidizer tank so as to replenish an empty space formed due to exhaustion of the oxidizer inside the sealed oxidizer tank. Consequentially, a problem of a sudden increase in vacuum and pressure drop can be resolved.

In addition, pressure in the oxidizer tank is maintained to be constant, whereby a drop in the pressurizing force of the oxidizer can be prevented in advance.

MODE FOR INVENTION

Hereinafter, an embodiment of a hybrid rocket engine using an electric motor-driven oxidizer pump according to the present disclosure will be described with reference to accompanying drawings. In this case, the present disclosure is not limited to or restricted by the embodiment. In addition, in describing the present disclosure, detailed descriptions of known functions or configurations may be omitted to clarify the gist of the present disclosure.

Figure 1:
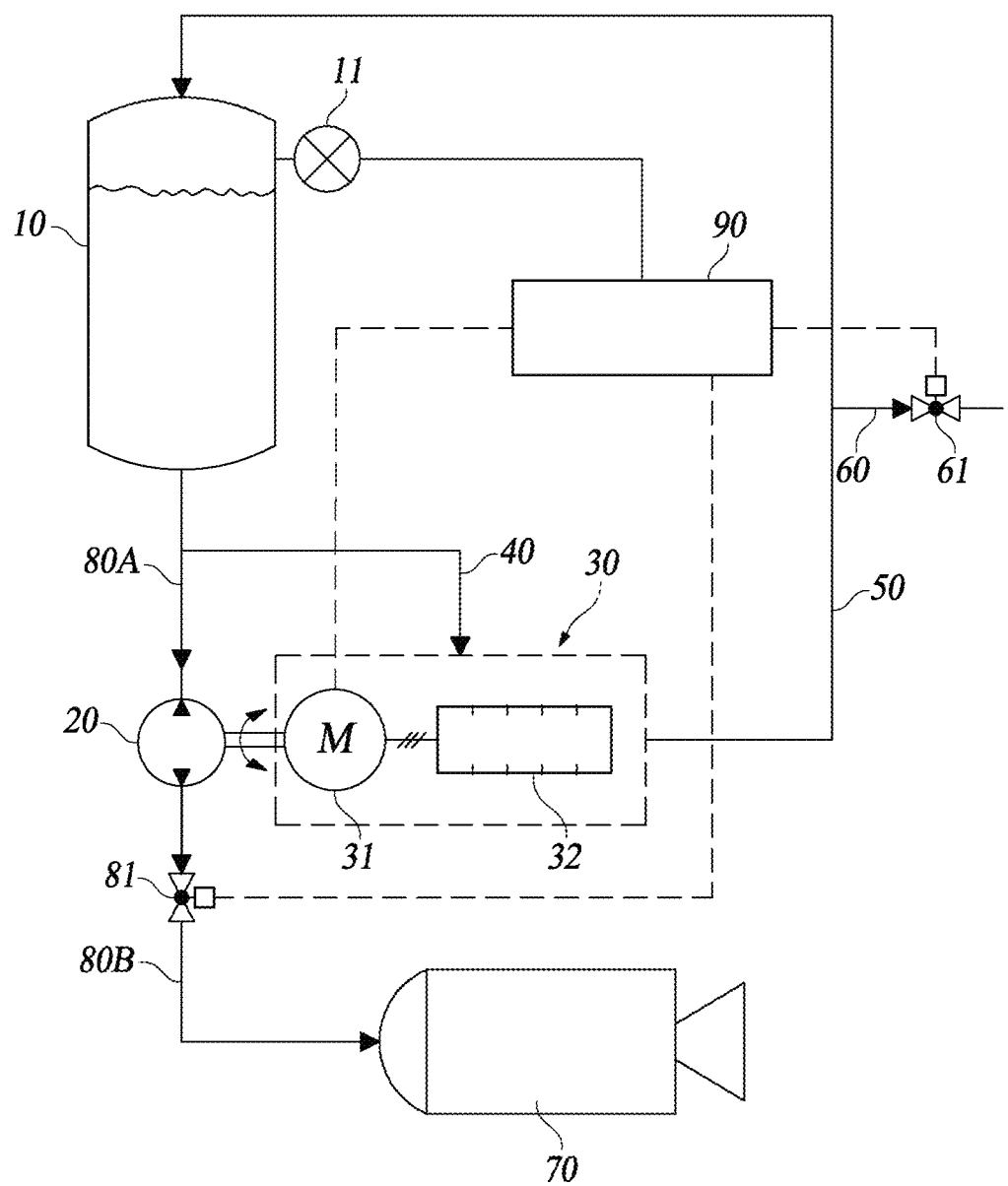
FIG. 1 is a view showing a structure of a hybrid rocket engine using an electric motor-driven oxidizer pump according to an embodiment of the present disclosure.

FIG. 1 is a view showing a structure of a hybrid rocket engine using an electric motor-driven oxidizer pump according to an embodiment of the present disclosure.

With a reference to FIG. 1, a hybrid rocket engine 1 using the electric motor-driven oxidizer pump, which maintains the pressure of an oxidizer tank 10, thereby preventing the pressurizing force of an oxidizer from being dropped, is disclosed.

A combustion process of the propellants in the combustion chamber 70 is required to obtain propulsion in the hybrid rocket engine 1, and to this end, the oxidizer should be supplied into the combustion chamber 70 in which solid fuel is mounted.

In the present embodiment, the hybrid rocket engine 1 includes the oxidizer tank 10, an oxidizer pump 20, a drive unit 30, an auxiliary oxidizer line 40, an oxidizer recirculation line 50, an oxidizer discharge line 60, and a combustion chamber 70.

The hybrid rocket engine 1 includes: the oxidizer tank 10 configured to store the oxidizer; the oxidizer pump 20 configured to pressurize the oxidizer by being connected to the oxidizer tank 10 through a first oxidizer supply line 80A; the drive unit 30 including an electric motor 31 configured to drive the oxidizer pump 20 and a battery 32 configured to supply power to the electric motor 31; and the auxiliary oxidizer line 40 configured to guide the oxidizer from the oxidizer tank 10 to cool the drive unit 30.

In addition, the hybrid rocket engine 1 includes: the oxidizer recirculation line 50 configured to guide the oxidizer to be recharged to the oxidizer tank 10 after the oxidizer has been circulated through the drive unit 30; the oxidizer discharge line 60 configured to discharge the oxidizer to the outside by being branched off the oxidizer recirculation line 50; and the combustion chamber 70 configured to combust the oxidizer and fuel by being connected to the oxidizer pump 20 through a second oxidizer supply line 80B.

That is, the auxiliary oxidizer line 40 has a structure configured to cool the electric motor 31 by supplying a portion of the oxidizer supplied through the first oxidizer supply line 80A to the electric motor 31 and to pressurize the oxidizer tank 10 by filling the oxidizer therein by the pressure generated by evaporation of the oxidizer through heat exchange between the electric motor 31 and the oxidizer.

The oxidizer discharge line 60 includes an oxidizer discharge valve 61 that is opened to discharge the oxidizer or closed, and the second oxidizer supply line 80B includes a main oxidizer supply valve 81 that is opened to supply the oxidizer to the combustion chamber 70 or closed.

In the present embodiment, the oxidizer tank 10 of the hybrid rocket engine 1 includes: a pressure sensor 11 configured to measure pressure inside the oxidizer tank 10; and a controller 90 configured to receive data from the pressure sensor 11 and to control the oxidizer discharge valve 61, the main oxidizer supply valve 81, and the electric motor 31 according to a set algorithm.

In the meanwhile, propulsion performance such as thrust is very important in a function of a rocket. In chemical rockets including hybrid rockets, high-temperature and high-pressure gas generated by combusting propellants in the combustion chamber 70 is ejected at high speed through a nozzle to generate the thrust. Therefore, the propulsion performance is greatly affected by the combustion performance and characteristics of the rocket engine.

Therefore, in the hybrid rocket engine 1, a regression rate, which is a speed at which the solid fuel is combusted, is used as a combustion rate representing combustion performance and may be expressed by a generalized relational equation, which is an empirical equation, as follows.

$$\gamma = aG_o^n$$

where $\gamma$ is the regression rate, a and n are empirical constants, and $G_o$ is an oxidizer mass flow rate, which is the oxidizer mass flow rate per unit area.

As may be seen from the above relational equation, the combustion performance of the hybrid rocket engine 1 is directly related to the oxidizer mass flow rate.

In general, the mass flow rate may be expressed as follows as a function of a pressure difference between an inlet (front stage) and an outlet (rear stage) in control volume, and the mass flow rate may be changed by adjusting the pressure.

$$m = \rho A v$$

$$v = \sqrt{\frac{2\Delta P}{\rho}}$$

$$m = A\sqrt{2\rho\Delta P}$$

where m is the mass flow rate of the fluid, $\rho$ is the density of the fluid, A is the cross sectional area of the fluid, v is the velocity of the fluid, and $\Delta P$ is the pressure difference between the pre stage and rear stage in the test volume.

That is, in the case of the hybrid rocket engine 1, the thrust may be controlled by adjusting the oxidizer mass flow rate according to a pressure condition at which the oxidizer supply is made to the combustion chamber 70, and a stable oxidizer supply pressure plays an important role as one factor of propulsion performance.

In the present embodiment, when the oxidizer is to be supplied to the combustion chamber 70, the hybrid rocket engine 1 uses the oxidizer pump 20 driven by the electric motor 31 in order to pressurize the oxidizer. The inlet (front stage) pressure of the oxidizer pump 20 is controlled by the pressure of the oxidizer tank 10, and the pressure of the outlet (rear stage) of the oxidizer pump 20 is pressure at which the oxidizer having been pressurized at a regular compression ratio by the oxidizer pump 20 is discharged and also becomes the oxidizer supply pressure applied to the combustion chamber 70.

When the pressure of the oxidizer tank 10 rapidly fluctuates, such as when the oxidizer in the oxidizer tank 10 is rapidly exhausted with the operation of the oxidizer pump 20, a sudden change in the inlet (front stage) pressure of the oxidizer pump 20 occurs, causing shock and damage to the impeller of the oxidizer pump 20 due to cavitation in the oxidizer pump 20 or resulting in non-uniformity and instability of the pressure of the oxidizer being supplied to the combustion chamber.

Accordingly, a separate pressurization system may be required to ensure the stability of the inlet (front stage) pressure of the oxidizer pump 20. However, in the hybrid rocket engine 1 using the electric motor-driven oxidizer pump, with the oxidizer cooling the drive unit 30 including the electric motor 31 and the battery 32 through the circulation thereto, the low-temperature oxidizer is evaporated and pressurized so as to be recharged into the oxidizer tank 10, whereby a separate pressurization system may be eliminated and the oxidizer supply system in the hybrid rocket engine 1 may be simplified.

Figure 2:
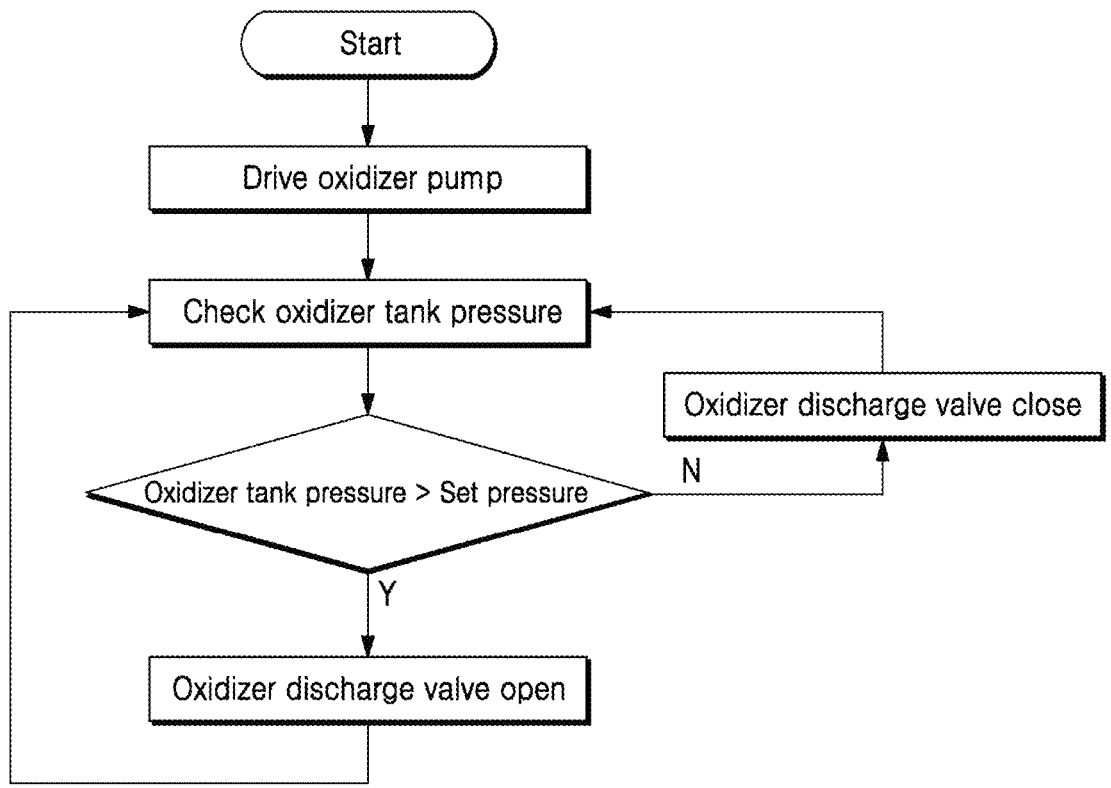
FIG. 2 is a view showing a control state of an oxidizer discharge valve provided in an oxidizer discharge line according to an embodiment of the present disclosure.

FIG. 2 is a view showing a control state of the oxidizer discharge valve provided in the oxidizer discharge line according to the embodiment of the present disclosure.

With a reference to FIG. 2, the oxidizer discharge valve 61 has a structure configured, by a signal from the controller 90, to be opened when the pressure of the oxidizer tank 10 is greater than a set pressure and to be closed when the pressure of the oxidizer tank 10 is no greater than the set pressure of the oxidizer tank 10.

That is, the pressure value received from the pressure sensor 11 installed in the oxidizer tank 10 is compared with a set value through the controller 90. When the pressure of the oxidizer tank 10 is higher than the set value, the oxidizer discharge valve 61 is opened, and when the pressure of the oxidizer tank 10 is no higher than the set value, the oxidizer discharge valve 61 is closed. Accordingly, by adjusting the pressure of the oxidizer tank 10 to be constant, stability of the pressure of the oxidizer tank 10, that is, the inlet (front stage) pressure of the oxidizer pump 20, may be secured.

In addition, the controller 90, in addition to performing control to maintaining the pressure of the oxidizer tank 10, may regulate the flow rate of the oxidizer pressurized through rotational speed (rpm) control of the electric motor 31 driving the oxidizer pump 20 and perform control function of the main oxidizer supply valve 81 for supplying the oxidizer into the combustion chamber 70.

Therefore, the hybrid rocket engine 1 uses the electric motor 31 and the battery 32 to drive the oxidizer pump 20 so as to supply the oxidizer, thereby simplifying the system and reducing the weight of the oxidizer tank 10, so that advantages as a projectile propulsion engine may be maximized.

In addition, the drive unit 30 including the electric motor 31 and battery 32 is cooled by the low-temperature oxidizer being circulated there through. Through this process, the evaporated and pressurized oxidizer is recharged to a top portion of the oxidizer tank 10 so as to replenish an empty space formed due to exhaustion of the oxidizer inside the sealed oxidizer tank 10. Consequentially, a problem of a sudden increase in vacuum and pressure drop may be resolved.

In addition, the pressure in the oxidizer tank 10 is maintained to be constant, whereby a drop in the pressurizing force of the oxidizer may be prevented in advance.

As above, the present disclosure has been shown and described in connection with an exemplary embodiment for illustrating the principle of the present disclosure. However, the present disclosure is not limited to the configuration and operation the same as shown and described as such. Rather, it will be well understood by those skilled in the art that a number of changes and modifications may be made to the present disclosure without departing from the spirit and scope of the appended claims.

INDUSTRIAL APPLICABILITY

The present disclosure may prevent a rapid pressure drop in an oxidizer tank from occurring by using pressure generated by an oxidizer evaporated at the same time when a low-temperature oxidizer cools an overheated electric motor and battery.

The invention claimed is:
1. A hybrid rocket engine comprising:
an oxidizer tank configured to store an oxidizer;
an oxidizer pump configured to pressurize the oxidizer by being connected to the oxidizer tank through a first oxidizer supply line;

a drive unit comprising an electric motor configured to drive the oxidizer pump and a battery configured to supply power to the electric motor;

an auxiliary oxidizer line configured to guide the oxidizer from the oxidizer tank to the electric motor to cool the electric motor of the drive unit;

an oxidizer recirculation line connected from the drive unit to the oxidizer tank; and a combustion chamber configured to combust the oxidizer and fuel by being directly connected to the oxidizer pump through a second oxidizer supply line on which a main oxidizer supply valve is disposed, wherein a portion of the oxidizer is bled from upstream of the oxidizer pump and supplied to the electric motor and the battery of the drive unit through the auxiliary oxidizer line, is vaporized through heat exchange between the electric motor and the oxidizer, and subsequently exits the drive unit to be returned to the oxidizer tank through the oxidizer recirculation line, thereby recharging the oxidizer tank and pressuring an inner side thereof, and wherein the oxidizer pump is driven by the electric motor powered by the battery.

2. The hybrid rocket engine of claim 1, wherein the auxiliary oxidizer is branched off from the first oxidizer supply line to allow the portion of the oxidizer to be supplied to the electric motor and to maintain pressure of the oxidizer tank to be constant by feeding oxidizer vapor, generated when the electric motor is cooled.

3. The hybrid rocket engine of claim 1, further comprising an oxidizer discharge line configured to discharge the oxidizer to the outside by being branched off the oxidizer recirculation line, wherein the oxidizer discharge line comprises an oxidizer discharge valve that is opened to discharge the oxidizer or closed, and the second oxidizer supply line comprises the main oxidizer supply valve that is opened to supply the oxidizer to the combustion chamber or closed.

4. The hybrid rocket engine of claim 3, wherein the oxidizer tank comprises a pressure sensor configured to measure pressure inside the oxidizer tank and further comprises a controller configured to receive data from the pressure sensor and to control the oxidizer discharge valve, the main oxidizer supply valve, and the electric motor according to a set algorithm.

5. The hybrid rocket engine of claim 4, wherein the oxidizer discharge valve has a structure configured to be opened when the pressure of the oxidizer tank is greater than set pressure and to be closed when the pressure of the oxidizer tank is no greater than the set pressure of the oxidizer tank.

6. The hybrid rocket engine of claim 1, wherein a solid fuel is mounted within the combustion chamber.

* * * * *